US009245269B2

(12) United States Patent
Sagady et al.

(10) Patent No.: US 9,245,269 B2
(45) Date of Patent: Jan. 26, 2016

(54) UNATTENDED RETAIL SYSTEMS, METHODS AND DEVICES FOR LINKING PAYMENTS, LOYALTY, AND REWARDS

(71) Applicant: USA TECHNOLOGIES, INC., Malvern, PA (US)

(72) Inventors: Cary Sagady, Chester Springs, PA (US); Denis Kouznetsov, Pottstown, PA (US)

(73) Assignee: USA Technologies, Inc., Malvern, PA (US)

( * ) Notice: Subject to any disclaimer, the term of this patent is extended or adjusted under 35 U.S.C. 154(b) by 0 days.

(21) Appl. No.: 14/485,274

(22) Filed: Sep. 12, 2014

(65) Prior Publication Data

US 2015/0066770 A1 Mar. 5, 2015

Related U.S. Application Data

(63) Continuation-in-part of application No. 14/015,150, filed on Aug. 30, 2013.

(51) Int. Cl.
G06F 7/08 (2006.01)
G06Q 20/40 (2012.01)
G06Q 20/36 (2012.01)
G06Q 30/02 (2012.01)
G06Q 20/34 (2012.01)
G07F 7/08 (2006.01)

(52) U.S. Cl.
CPC .......... *G06Q 20/4093* (2013.01); *G06Q 20/352* (2013.01); *G06Q 20/36* (2013.01); *G06Q 30/0226* (2013.01); *G07F 7/0893* (2013.01)

(58) Field of Classification Search
CPC ..... G06F 21/6254; G06F 21/31; G06F 21/00; G06F 21/34; G06F 21/606; G06F 2221/2101; G06F 2221/2115; G06F 2221/2119; G06F 2221/2153; G06K 7/0004; G06K 13/08; G06K 13/0887; G06K 13/0893
USPC ................................. 235/381, 375, 380, 382
See application file for complete search history.

(56) References Cited

U.S. PATENT DOCUMENTS

| 6,073,840 | A | 6/2000 | Marion |
| 6,424,300 | B1 * | 7/2002 | Sanford et al. ................. 343/702 |
| 6,601,759 | B2 | 8/2003 | Fife |
| 8,458,487 | B1 * | 6/2013 | Palgon et al. .................. 713/185 |
| 2003/0105643 | A1 * | 6/2003 | Chen et al. ........................ 705/1 |
| 2003/0172028 | A1 | 9/2003 | Abell |
| 2004/0025028 | A1 * | 2/2004 | Takeuchi ....................... 713/184 |
| 2005/0188005 | A1 * | 8/2005 | Tune .............................. 709/203 |
| 2006/0090073 | A1 * | 4/2006 | Steinberg et al. ............. 713/170 |

(Continued)

OTHER PUBLICATIONS

International Search Report and Written Opinion for PCT/US2014/052807, issued Jan. 23, 2015.

(Continued)

*Primary Examiner* — Thien M Le
(74) *Attorney, Agent, or Firm* — RatnerPrestia

(57) ABSTRACT

Methods for generating a consumer profile. The method may include receiving a purchase authorization request including a card number from a consumer, generating, with a key module, a hash value of the card number and generating, at the server, a card identifier. The method may also include associating the generated card identifier with the generated hash value, storing, at a server database, the associated card identifier, and associating, with a processor, the card identifier with the consumer profile.

12 Claims, 5 Drawing Sheets

(56) References Cited

U.S. PATENT DOCUMENTS

| | | | |
|---|---|---|---|
| 2010/0094456 A1 | 4/2010 | Simpkins | |
| 2011/0095891 A1* | 4/2011 | Fenkanyn | 340/572.7 |
| 2013/0054016 A1 | 2/2013 | Canter | |
| 2014/0136354 A1 | 5/2014 | Emery | |
| 2014/0258132 A1* | 9/2014 | Swamy et al. | 705/67 |
| 2015/0066770 A1* | 3/2015 | Sagady et al. | 705/44 |

OTHER PUBLICATIONS

Invitation to Pay Additional Fees and Partial International Search for Corresponding Application No. PCT/US2014/052807, Issued Nov. 26, 2014.

"NFC Forum Device Requirements, High Level Conformance Requirements Revision V1.0", Jan. 26, 2010, XPO55065535, Retrieved From the Internet: URL:http://certification .nfc-forum.org/doc s/.

"QX 70 Tap to Self-Service", Mar. 31, 2013, XPO551445, Retrieved From the Internet: URL:http://www.verifone.de/media/2750908/vg13_004_qx700_ds_ltr_46326b_0313.pdf.

"UL Tests Entire Ecosystem for the Creation of Softcard", Oct. 15, 2012; XPO55151046, Retrieved From the Internet: URL:http://www.ul-ts.com/case-studies/finish/29-case-studies/224-the-creation-of-ISIS-Mobile-Wallet.

"USA Technologies to Demonstrate Two New Cashless Payment Devices At NAMA Oneshow", Apr. 22, 2013, XP55151566, Retreived From Internet: URL:http://investor.usatech.com/common/download/download.cfm?.

"UX 400 High-Tech Self-Service Solution", Jun. 30, 2013, XP05511434, Retrieved From Internet: URL:http://global.verifone.com.media.30585 59/ux400_ds_a4.pdf.

International Search Report and Written Opinion of the International Searching Authority for International Application No. PCT/US2015/049578 mailed Oct. 28, 2015.

* cited by examiner

UNATTENDED RETAIL SYSTEMS, METHODS AND DEVICES FOR LINKING PAYMENTS, LOYALTY, AND REWARDS

CROSS-REFERENCE TO RELATED APPLICATIONS

This application is a continuation-in-part of patent application Ser. No. 14/015,150 entitled "VENDING APPROVAL SYSTEMS, METHODS, AND APPARATUS USING CARD READERS" filed on Aug. 30, 2013, the contents of which are incorporated fully herein by reference.

FIELD OF THE INVENTION

The invention relates to vending systems and, more particular, to methods, systems, and apparatus for linking payments with loyalty programs.

BACKGROUND OF THE INVENTION

Vending systems are often used to dispense products and/or services to consumer in locations where it would be impractical or inefficient to staff human beings to provide the products/services. Vending systems may be equipped with magnetic card readers and wireless payment systems. The wireless payment systems may utilize mobile payment applications. Operators of vending machines often implement loyalty programs to promote consumer loyalty. Improved methods, systems and apparatus for implementing consumer loyalty programs associated with wireless payment systems are desirable.

SUMMARY OF THE INVENTION

Aspects of the invention include a method for generating a consumer profile. The method includes receiving a purchase authorization request including a card number from a consumer, generating, with a key module, a hash value of the card number and generating, at the server, a card identifier. The method also includes associating the generated card identifier with the generated hash value, storing, at a server database, the associated card identifier, and associating, with a processor, the card identifier with the consumer profile.

Further aspects of the invention include a system for tracking purchases with a consumer profile. The system includes a key manager module including a hash value generator configured to generate a plurality of hash values from card numbers included in purchase authorization requests from consumers, and an association module configured to associate the plurality of hash values with a plurality of consumer profiles. The system also includes a server configured to receive purchase authorization requests from the consumer. The server include a server database that stores the plurality of consumer profiles and a determination module configured to, when the purchase authorization request does not include a consumer identifier, determine, with the plurality of consumer profiles stored in the server database and a hash value of a card number included in the purchase authorization request, whether the hash value is associated with one of the plurality of consumer profiles, and update a purchase history of the one of the plurality of consumer profiles when it is determined that the hash value is associated with the one of the plurality of consumer profiles.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. Included in the drawings are the following figures.

DETAILED DESCRIPTION OF THE INVENTION

Figure 1:
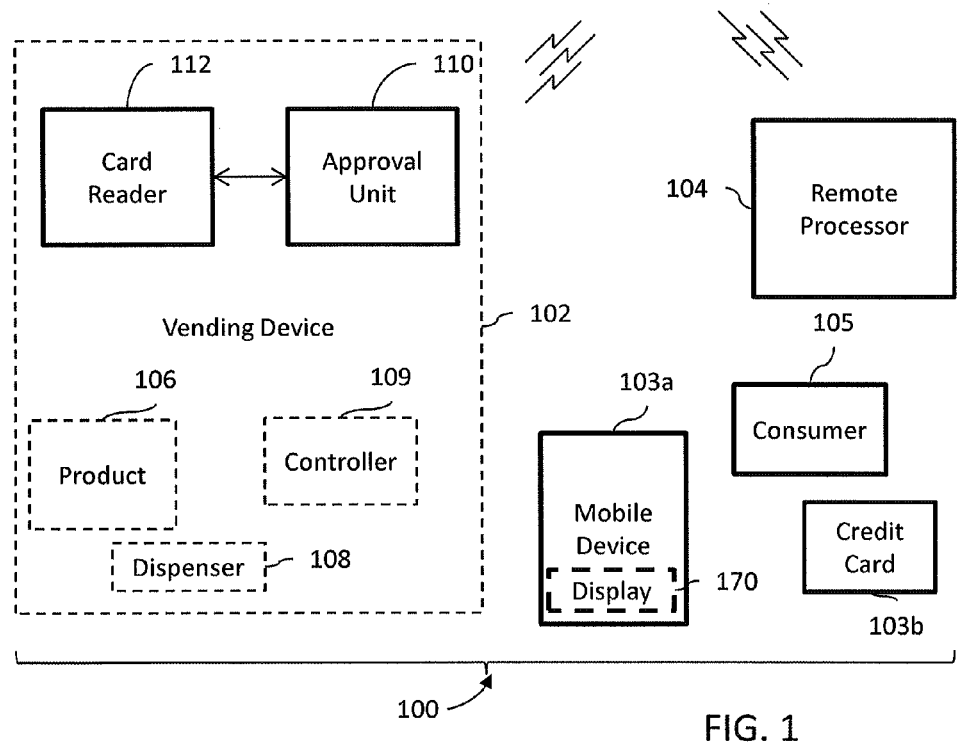
FIG. 1 is a functional block diagram of a vending system according to aspects of the invention.

FIG. 1 depicts a vending system 100. The vending system 100 includes a vending device 102 and a remote processor 104. Products 106 may be purchased by a consumer 105 at the vending device 102 and dispensed through a dispenser 108 under the control of a controller 109 of the vending device 102 such as a vending machine controller (VMC). The products 106 may be physical products such as cans of soda, boxes of candy, etc. and/or services such as a personal care service, e.g., a haircut. The vending device 102 may be a conventional vending machine or other device capable of dispensing/providing products 106.

The vending device 102 includes an approval unit 110 and a card reader 112. Although not illustrated, the controller 109 is coupled to the approval unit 110 and to a mechanism (not shown) for dispensing the product 106 stored within the vending devices 102 via the dispenser 108.

The approval unit 110 is configured to retrieve application data and payment information from a consumer. In an embodiment, the approval unit receives the application data and/or payment information via the card reader 112. In alternative embodiments, the approval unit may retrieve the application data and/or payment information directly without the use of a card reader.

The approval unit 110 may communicate the application data to a remote processor 104, e.g., for maintaining a customer loyalty program. The approval unit 110 may additionally communicate the payment information (e.g., wirelessly and/or via a network connection) to the remote processor 104 for verification. Upon verification of the payment information, the approval unit 110 may post funds to the vending device 102 (e.g., via the controller 109) to enable selection of a product 106 to be dispensed via the dispenser 108. The application data is data/information contained within an application (such as an electronic wallet like Softcard Wallet™ developed by Softcard, which was founded by AT&T Mobility, T-Mobile USA and Verizon Wireless) and/or is generated by an application where the information is retrieved by following an access protocol associated with the application. The application data may contain entity identification, offers, coupons, and other types of information associated with vending and/or customer loyalty programs. The entity identification may be information such as a unique number that may be used to identify an entity such as a consumer, a group of consumers, etc. For example, the entity identification could be a consumer ID associated with an account of a particular consumer, a group ID associated with accounts of a group of affiliated consumers, or other type of identifier.

The approval unit 110 may obtain the payment information from a mobile device 103a such as a smart phone or from a purchase card 103b. The purchase card 103b may be a conventional magnetic swipe credit or debit card or a smart card (e.g., a card with embedded integrated circuits capable of wireless communication). The mobile device 103a or a smart card may be used to implement an application such as an electronic wallet. Where application data is stored and/or generated by an application, the approval unit 110 may additionally obtain the application data from the mobile device 103a or smart card.

The mobile device 103a and the smart purchase cards 103b may each include a processor, a memory, and a transceiver for wireless communication. The mobile device 103a may additionally include a display 170 for displaying information, e.g., received from the approval unit 110. The mobile device 103a or smart purchase card 103b may be configured in accordance with, for example, a wireless communication standard such as a near-field communication (NFC) standard, a Bluetooth™ communication standard, or other communication standard capable of exchanging data over short distances. The mobile device 103a or smart purchase card 103b may include an application such as an electronic wallet that stores application data such as entity identification and payment information (e.g., a credit card number) in a memory and its processor may be configured to wirelessly communicate the application data and payment information via a transceiver. The application may be associated with a specific communication protocol that needs to be followed to access the application data that may be different than the protocol that needs to be followed to access the payment information. An example of a suitable application for use with the invention is an Softcard™ Mobile Wallet available from the Google play store hosted by Google Inc. of Mountain View, Calif. Suitable mobile devices 103a are available from AT&T, T Mobile, and Verizon. Purchase cards 103b may include a magnetic strip, wireless communication transceiver, electrical contacts and/or other structure for communicating payment information such as a credit card number.

Figure 1A:
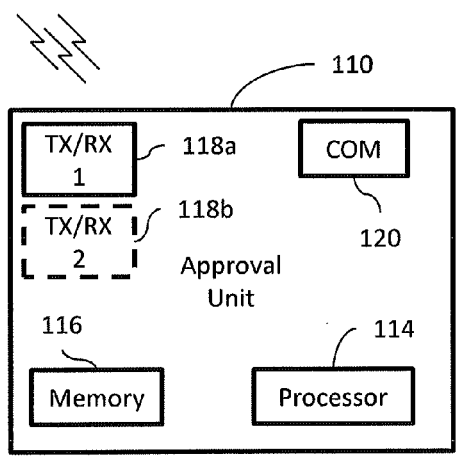
FIG. 1A is a functional block diagram of an approval unit for use in the vending system of FIG. 1.
Figure 1B:
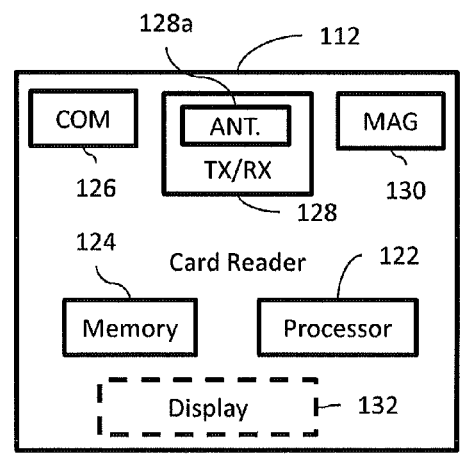
FIG. 1B is a functional block diagram of a card reader for use in the vending system of FIG. 1.

FIG. 1A depicts an embodiment of an approval unit 110 in additional detail. The approval unit 110 includes a processor 114 and a memory 116. Memory 116 may store instructions that, when executed, configure the processor 116 to perform functions attributable to approval units described herein. The approval unit 110 additionally includes a first transceiver (TX/RX) 118a for wireless communication with the remote processor 104 (FIG. 1) and a communication port 120 for communication with the card reader 112 (e.g., via a wired connection to a corresponding communication port 126; FIG. 1B). Although not illustrated, the processor 114 is coupled to the memory 116, the first TX/RX 118, and the communication port 120 for sending data to and/or receiving data from each of these components. Suitable components for use in approval unit 110 will be understood by one of skill in the art from the description herein.

In an embodiment, the approval unit 110 may include a second transceiver 118b for wireless communication directly with a mobile device 103a or smart purchase card 103b instead of, or in addition to, the communication port 120. In accordance with this embodiment, the card reader 112 may be omitted. The first and second TX/RX 118a and 118b each include a transmitter, a receiver, and an antenna. In an embodiment, the first transceiver 118 is configured for wireless communication with a remote processor, e.g., via a cellular network, and the second transceiver 118b is configured for wireless communication with a mobile device 103a or smart payment card 103b in accordance with a wireless communication standard such as a near-field communication (NFC) standard, a Bluetooth™ communication standard, or other communication standard capable of exchanging data over short distances.

FIG. 1B depicts an embodiment of a card reader 112 in additional detail. The card reader 112 includes a processor 122 and a memory 124. Memory 124 may store instructions that, when executed, configure the processor 122 to perform functions attributable to card readers described herein. The card reader 112 additionally includes a communication port 126 for communication with the approval unit 110 (e.g., via a corresponding communication port 120; FIG. 1A), a transceiver (TX/RX) 128 for communicating with wireless devices (e.g., mobile devices 103a and smart credit cards 103b; FIG. 1), a magnetic reader 130 (e.g., for reading the magnetic stripe of a magnetic purchase card 103b), and an optional display 132 for displaying information to a consumer 105 using the vending device 102. The TX/RX 128 includes a transmitter, a receiver, and an antenna 128a. Although not illustrated, the processor 122 is coupled to the memory 124, the communication port 126, the TX/RX 128, the magnetic reader 130, and the display 132 for sending data to and/or receiving data from each of these components. Suitable components for use in card reader 112 will be understood by one of skill in the art from the description herein. In embodiments where the card reader 112 is omitted or the card reader does not include a display 132, the approval unit 110 may send information/instructions to the mobile device 103a for presentation on a display 170 of the mobile device.

Loyalty programs are often used in vending systems with mobile devices that have mobile wallet applications installed thereon. The loyalty programs typically reward consumers based on frequency of use of the wallet application and/or amount of money spent with the wallet application or vending machine. Alternatively, an operator of a vending machine or vending system may desire to implement a loyalty reward program for consumers independent of the mobile wallet application used. For example, such loyalty programs can reward consumers based on the use of a particular machine or of machines belonging to a particular owner or company. In any event, to reward consumers, the transaction/purchase history of the consumer should be tracked.

As is disclosed herein, multiple types of information and data can be stored to track purchases of consumers for loyalty programs. Generally, the disclosed systems and methods compile various identifying data and information into a plurality of consumer profiles, with each consumer profile being associated with one consumer. The consumer profile can include a consumer identification ("consumer ID"). Typically, mobile wallet applications utilize a consumer ID unique to each consumer, and that consumer ID is usually included in a purchase authorization request. The systems and methods disclosed herein can receive the consumer ID and either determine if the consumer ID is associated with a consumer profile to update the purchase history of the consumer, or use the consumer ID to create a new consumer profile. However, it is often the case that the consumer ID is not included in the purchase authorization requests, or that the consumer ID is new while the consumer has an existing consumer profile. In such cases, the systems and methods disclosed herein receive a card number (e.g., credit card, debit card, gift card, account associated with a mobile wallet application, etc.) included in the purchase authorization request (usually encrypted). With the card number, a hash value of the card number is generated.

A card identifier ("card ID") may also be generated that is associated with the generated hash value and is associated with a consumer profile. The system may then determine if the hash value has been previously associated with a consumer profile either directly or indirectly (e.g., via association of the hash value with a card ID that is associated with the consumer profile). If the hash value has been previously associated with a consumer profile directly and/or indirectly via a card ID, the purchase history of the consumer may be updated (e.g., in the consumer profile). If the hash value has not been previously associated with a consumer profile directly or indirectly (e.g., via a card ID), the system may generate a new consumer profile and/or a new card ID for the hash value, and associate the hash value with the new consumer profile directly and/or indirectly by associating the hash value with the new card ID and associating the new card ID with the new consumer profile. Thus, the purchase history of each consumer can be tracked with various consumer information and data and can be tracked over a variety of different mobile wallet applications.

Figure 2:
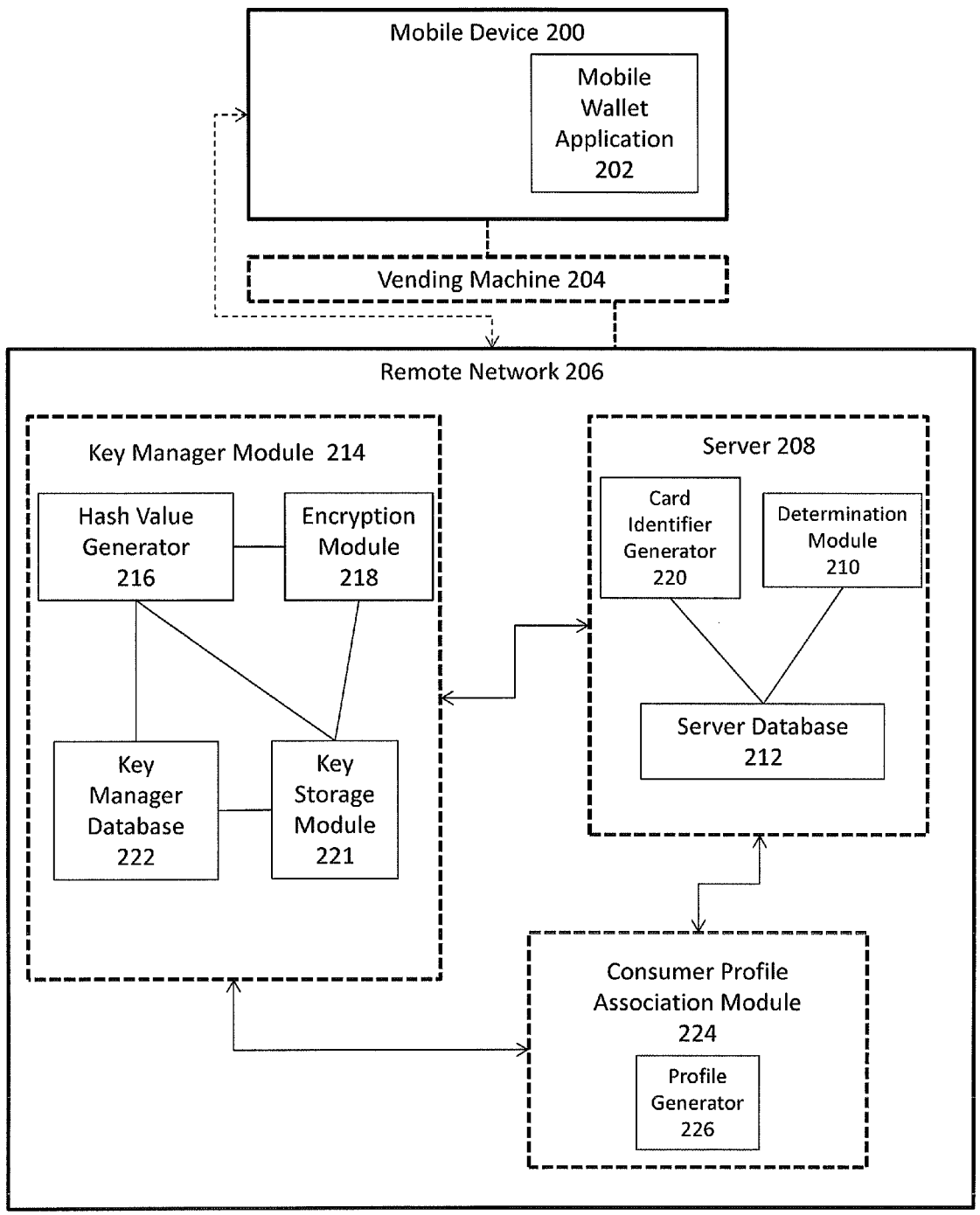
FIG. 2 is a functional block diagram of a remote processor in accordance with aspects of the invention.

Referring to FIG. 2, a functional block diagram of a remote network 206 is shown. The remote network 206 is configured to transmit and receive signals (e.g., purchase authorization requests) from a consumer via a mobile device 200 (through the mobile wallet application 202), or via a vending machine 204 through the mobile device 200. The remote network 206 includes a server 208, a key manager module 214, and a consumer profile association module 224. Although these components are depicted as separate units in the diagram of FIG. 2, it is contemplated that the components and subcomponents can be implemented as a single unit, and/or as part other system units outside of the remote network 206. As depicted, the server 208, key manager module 214 and the consumer profile association module 224 are in bi-directional communication with each other.

The server 208 includes a determination module 210 a server database 212 and a card identifier generator 220. The server database 212 is configured to store information and data relating to the consumer (e.g., a plurality of consumer profiles) and is in communication with the determination module 210. The determination module 210 is configured to make various determinations as related to the information included in purchase authorization requests. For example, the determination module 210 may be configured to determine whether purchase authorization request includes a consumer ID, and, if so, determine whether the consumer ID is associated with a consumer profile by querying the server database 212. If the purchase authorization request does not include a consumer ID, the determination module 210 is configured to query the key manager module 214 to determine whether a card number included in the authorization request is associated with a consumer profile. Once the determination module 210 determines that either a consumer ID or a card number is associated with a consumer profile, the determination module 210 updates the corresponding consumer profile, and the update is stored in the server database 212.

The card ID generator 220 is configured to generate a card ID unique to each card account used. The card ID may be generated sequentially in integer increments with respect to a previously generated card ID. For example, the card ID generated may be a value of 01234 when the previously generated card ID is 01233. The card ID is generated such that the card ID conveys no information about the card number to which the card ID is ultimately associated. The sequential generation of the card ID advantageously provided additional security, as the card ID is generated independently from the hash value, such that the card ID conveys no information of the hash value or the card number. In the event the card ID is intercepted, the hash value and card number associated with the card ID cannot be derived. Once generated, the card ID may be stored in the server database 212.

The key manager module 214 includes a hash value generator 216, an encryption module 218, a key storage module 221, and a key manager database 222. The hash value generator 216 is configured to generate a hash value from a card number or an encrypted card number that is included in, for example, a purchase authorization request from a consumer. The hash value may be generated using a private key, (e.g., a key stored on the key storage module 221) associated with the key manager module 214 and stored in the key manager database 222. In an embodiment, the hash value is generated such that the hash value communicates no information about the card number. That is, the card number cannot be derived from the hash value without access to the private key. The hash value that is generated may be stored in the key manager database 222.

The key manager module 214 may additionally include an encryption module 218, e.g., for use in embodiments where additional security is desired. For example, the hash value generated by the hash value generator 216 may be encrypted by the encryption module 218 prior to the card ID being generated by the card ID generator 220. Other added security benefits with the encryption module 218 will be understood by one of skill in the art from the description herein.

The key storage module 221 is configured to store the private keys used for generating hash values via the hash value generator 216, the encrypted hash values via the encryption module 218, etc.

The remote network 206 also includes a consumer profile association module 224. The consumer profile association module 224 has a profile generator 226. The association module 224 is configured to associate hash values, card IDs, and/or consumer IDs with consumer profiles. In an embodiment where the determination module 210 determines that the consumer ID, card ID, or hash value is not associated with a consumer profile, the corresponding consumer ID, card ID, or hash value is sent to the association module 224. The association module 224 then accesses the server database 212 to associate the consumer ID, card ID or hash value with an existing consumer profile (e.g., when a profile exists for a consumer, but the consumer uses a new card, which results in an additional card ID to be associated with the consumer profile). If the consumer does not have an existing consumer profile, the association module 224 is configured to, via the profile generator 226, generate a new consumer profile for the consumer ID, card ID, or hash value. Once the new consumer profile is generated, the association module 224 associates the consumer ID, card ID, or hash value, with the new consumer profile, and then sends the consumer profile to the server database 212 for storage with the other plurality of consumer profiles. In one embodiment, the hash value is not directly associated with the consumer profile, rather the hash value is associated with the consumer profile indirectly by association of the card ID that is associated with the hash value being associated with the consumer profile. Such embodiment provide an added level of security, in that neither the hash value nor the card number is associated with the consumer ID or the server database 212.

Figure 3:
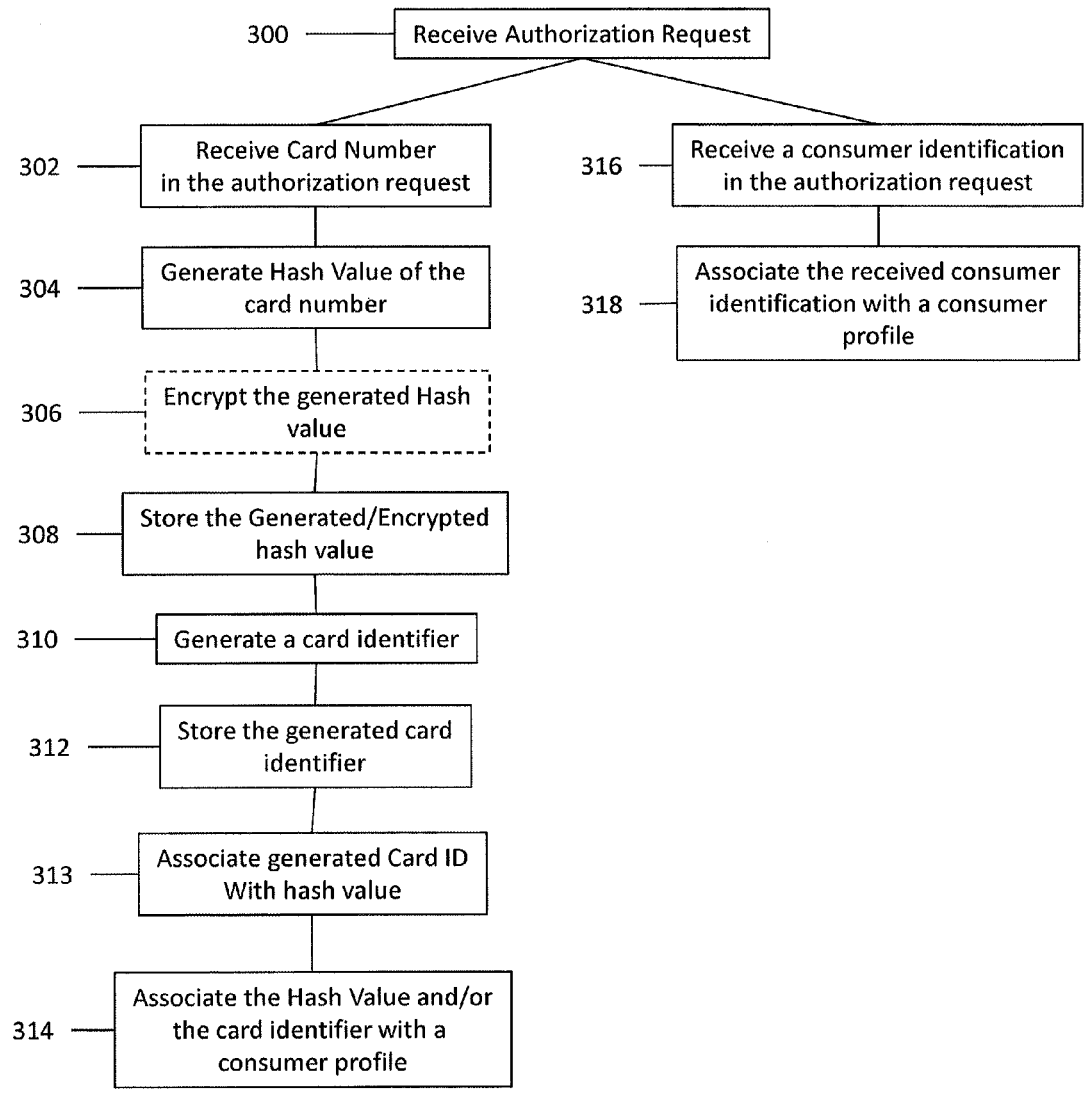
FIG. 3 is a flowchart depicting steps for generating a consumer profile in accordance with aspects of the invention.

Referring next to FIG. 3, a flowchart 30 of steps for generating consumer profiles is shown. At block 300, a purchase authorization request is received. The authorization request may be received from a mobile device and/or via a vending machine by a remote network (e.g., remote network 206). Once received, a server of the remote network analyzes the authorization request and determines, via a determination module, whether the request includes card information, a consumer ID, or both.

At block 302, the remote network receives a card number in the authorization request. The card number may be that of a credit card, debit card, gift card, account associated with a mobile wallet application, etc. In an embodiment, the card number is encrypted prior to being received from the authorization request.

At block 304, a hash value of the card number is generated. The hash value may be generated via a hash value generator (e.g., generator 216) and may be generated using a private key. Once generated, the hash value is optionally encrypted at block 306. At block 308, the hash value is stored. The hash value may be stored in a key manager database to maintain security (e.g., a database separate from a server of the remote processor).

At block 310, a card identifier (e.g., card ID) is generated. The card ID may be generated sequentially in integer increments with respect to a previously generated card ID. At block 312, the card ID is stored. The card ID may be stored on the key manager module, server database, etc.

At block 313, the card ID is associated with the hash value. The card ID may be associated via an association module (e.g., association module 224). The association of the card ID with the hash value is also stored. The hash value and card ID association may be stored on the server database, the key manager module, or both.

At block 314, the hash value is associated with a consumer profile. The hash value may be associated via an association module (e.g., association module 224). The hash value may be associated directly with the consumer profile. In one embodiment, the hash value is indirectly associated with the consumer profile. In such embodiments, the card ID is directly associated with the consumer profile, such that the sensitive information of the hash value is not directly associated (or stored with) the consumer profile. Once associated, the consumer profile may be stored in a server database.

Referring to block 316, the determination module determines that the authorization request includes a consumer ID, and the consumer ID is received. Once received, the consumer ID is associated with a consumer profile at block 318.

The methods depicted in flowchart 30 advantageously allow for multiple types of data and information to be associated with a consumer profile. For example, a consumer may use two mobile wallet applications, resulting in two consumer IDs, and may use three payment cards, resulting in three hash values and three card IDs. With the systems and methods disclosed herein, all the card IDs, hash values, and consumer IDs can be associated with a single consumer profile, such that improved purchase tracking of the consumer can be implemented with loyalty programs. In an embodiment, the loyalty program may reward a consumer by making every fifth purchase free. By tracking purchases as described herein, such loyalty programs can be advantageously implemented across multiple wallet applications, vending machines, and payment methods.

Figure 4:
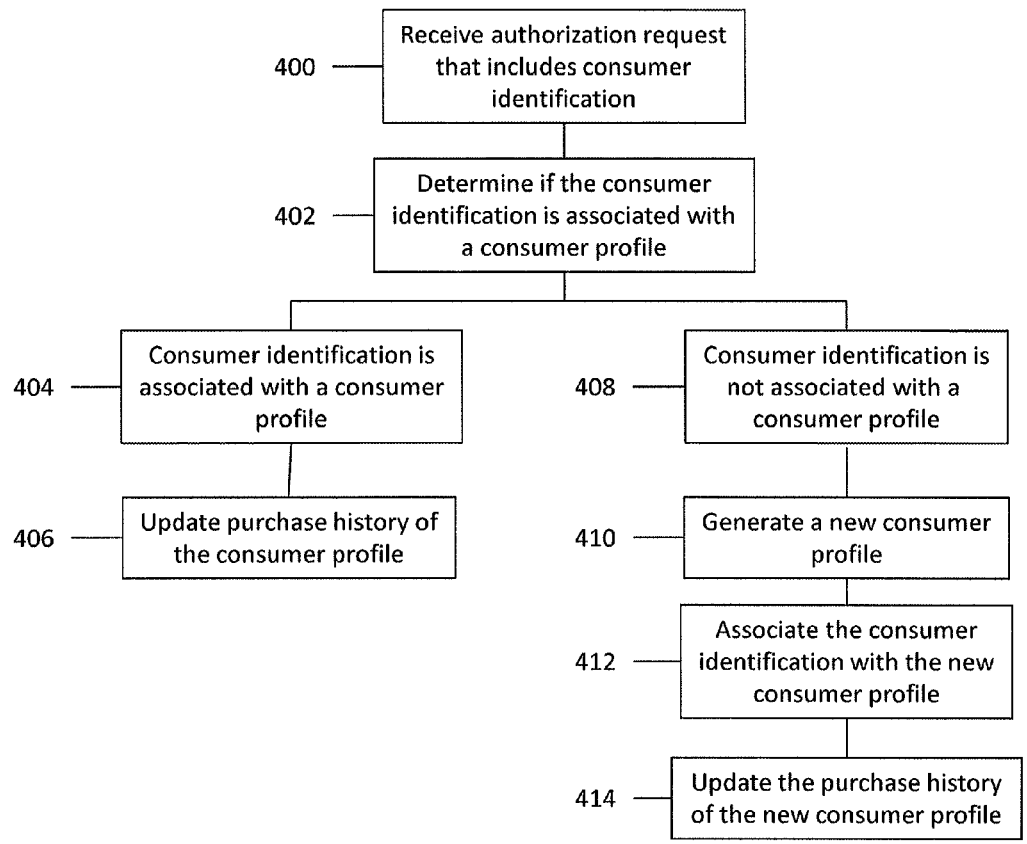
FIGS. 4 and 5 are flowcharts depicting steps for updating and creating consumer profiles according to aspects of the invention.
Figure 5:
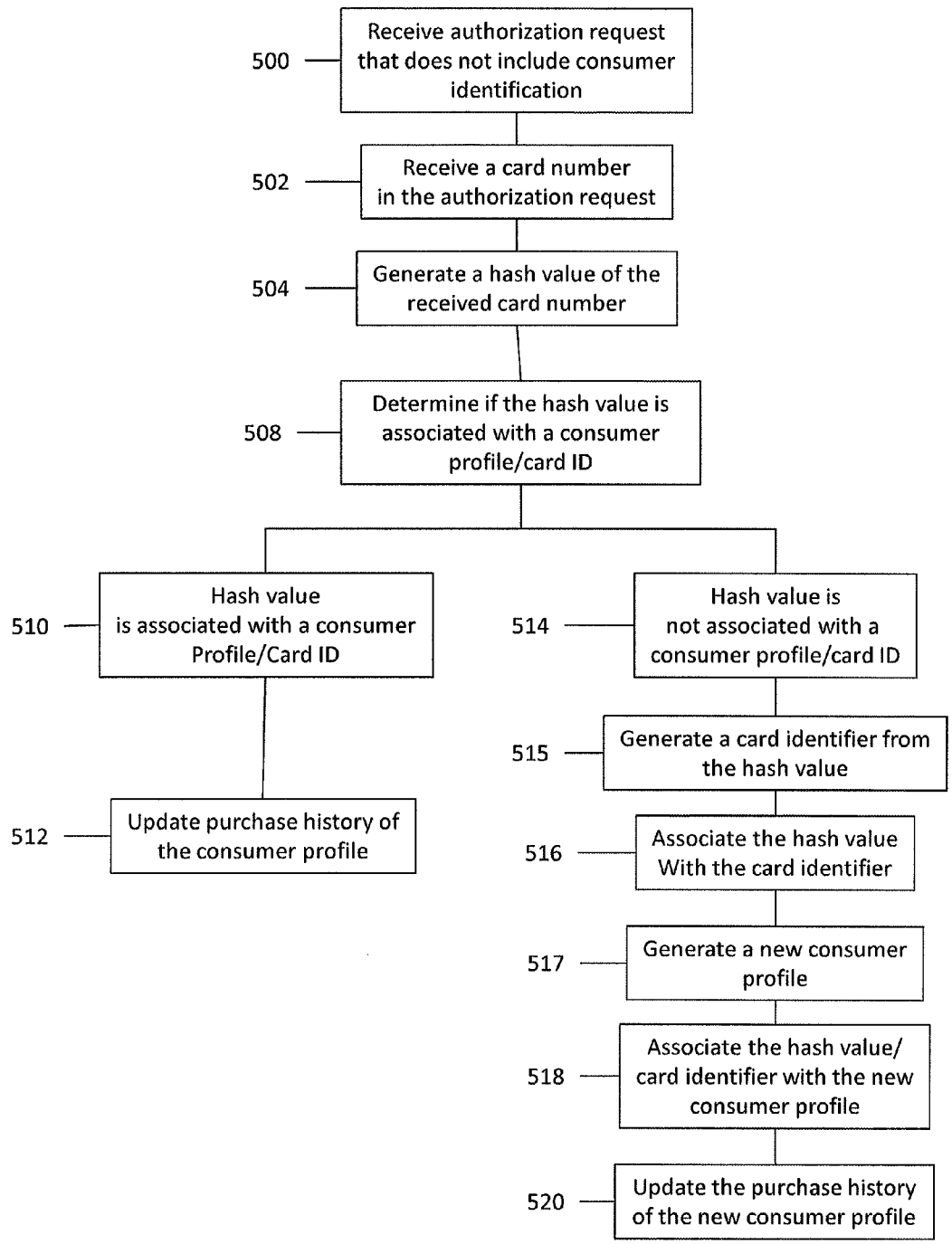

In FIG. 4 and FIG. 5, flowcharts of methods for updating consumer profiles are depicted. Referring to FIG. 4, a flowchart 40 of steps for updating a consumer profile from a payment authorization request that includes a consumer ID is depicted. At block 400, an authorization request that includes a consumer ID is received. The authorization request may be received via a remote network.

At block 402, it is determined if the consumer ID is associated with an existing consumer profile. The determination may be made by a determination module in the server of the remote network. In an embodiment, a database in the server stores a plurality of consumer profiles, and the determination module queries the server database of the plurality of consumer profiles to determine whether the received consumer ID is associated with one of the plurality of consumer profiles.

At block 404, the received consumer ID is determined to be associated with an existing consumer profile. Thus, at block 406, the purchase history of the consumer can be updated, and then stored and associated with the consumer profile. For example, the purchase history of the consumer profile may indicate the consumer has made three purchases, and upon approval of the authorization request, the profile is updated to indicate that the consumer has made four purchases.

At block 408, the determination of block 402 indicates that the consumer ID received in the authorization request is not associated with an existing consumer profile of the plurality of consumer profiles. Thus, at block 410, a new consumer profile is generated. The consumer profile may be generated by a profile generator, such as generator 226, that is part of an association module, such as association module 224.

At block 412, the consumer ID is associated with the new consumer profile that was generated at block 410. The consumer ID may be associated with the new consumer profile via an association module, and then stored in a server database. Then, at block 414, the purchase history of the new consumer profile is updated similar to block 406.

Referring next to FIG. 5, a flowchart 50 of steps for updating a consumer profile when an authorization request does not include a consumer ID is depicted. At block 500, a purchase authorization request is received that does not include a consumer ID.

At block 502, a card number is received in the purchase authorization request. The card number may be a credit card number, a debit card number, a gift card number, a mobile wallet account number, etc. In an embodiment, the card number is encrypted prior to being received.

At block 504, a hash value of the card number is generated. The hash value may be generated by a hash value generator using a private key in a key manager module of a remote processor. Once generated, the hash value may be encrypted for additional security.

At block 508, it is determined whether the hash value is associated with an existing consumer profile. In an embodiment, the determination module makes the determination, by querying a key manager database in the key manager module. The generated hash value may be compared to other hash values stored in the key manager database that are associated with consumer profiles. In an embodiment, the generated hash value may be compared with associated card IDs to determine whether the generated hash value has been previously associated with a card ID, thereby determining whether the hash value is associated with a consumer profile.

If it is determined that the or hash value is associated with a consumer profile at block 510, the purchase history of the consumer is updated at block 512 similar to the purchase history update step at block 406 for the consumer ID. If it is determined that the or hash value is not associated with a consumer profile at block 514, then a new consumer profile is generated, the hash value is associated with the new consumer profile, and the purchase history is updated at blocks 515, 516, 517, 518, and 520, similar to blocks 410, 412, and 414 with the consumer IDs.

At block 515, a card identifier (e.g., card ID) is generated. The card ID is generated by a card identifier generator, which may reside on the server and/or the key manager module. The card ID may be generated sequentially in integer increments with respect to a previously generated card ID. The card ID may be stored on the key manager module, server database, etc.

At block 516, the generated card ID is associated with the hash value. The card ID may be associated via an association module (e.g., association module 224). The association of the card ID with the hash value is also stored. The hash value and card ID association may be stored on the server database, the key manager module, or both.

At block 517, a new consumer profile is generated. The consumer profile may be generated by a profile generator, such as generator 226, that is part of an association module, such as association module 224.

At block 518, the hash value is associated with a consumer profile. The hash value may be associated via an association module (e.g., association module 224). The hash value may be associated directly with the consumer profile. In one embodiment, the hash value is indirectly associated with the consumer profile. In such embodiments, the card ID is directly associated with the consumer profile, such that the sensitive information of the hash value is not directly associated (or stored with) the consumer profile. Once associated, the consumer profile may be stored in a server database.

At block 520, the purchase history of the newly generated consumer profile with the associated hash value/card ID is updated.

It is contemplated that the steps depicted in flowcharts 40 and 50 may be used in conjunction. For example, if at block 408, it is determined that the consumer ID is not associated with a consumer profile, the system may optionally proceed to block 502 instead of generating a new consumer profile at block 410. Such an embodiment is advantageous when a consumer profile exists for the consumer, but the consumer is using a different mobile wallet application with a new consumer ID, or the mobile wallet application fails to send the consumer ID with the purchase authorization request. In one embodiment, the system performs the steps of both flowchart 40 and 50. For example, the systems may generate a new consumer profile and associate both a consumer ID and a hash value/card ID with the consumer profile in the same transaction. In another embodiment, the system will not generate a new consumer profile until both the determination at block 408 that the consumer ID is not associated with a consumer profile and the determination at block 514 that the hash value/card ID is not associated with a consumer profile is made. One of skill in the art will understand various orders and combinations of the steps in flowcharts 40 and 50 from the description herein.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for generating a consumer profile, comprising:
   receiving, via a server, a purchase authorization request including a card number from a consumer;
   generating, with a key module, a hash value of the card number;
   generating, at the server, a card identifier;
   associating the generated card identifier with the generated hash value;
   storing, at a server database, the associated card identifier; and
   associating, with a processor, the card identifier with the consumer profile;
   wherein the card identifier is generated in a sequential integer increment with respect to a previously generated card identifier.

2. The method of claim 1, further comprising:
   receiving, via the server, a purchase authorization request including a consumer identifier from the consumer; and
   associating, with the processor, the consumer identifier with the consumer profile.

3. The method of claim 2, further comprising associating the consumer identifier with the generated card identifier.

4. The method of claim 1, further comprising:
   encrypting, with an encryption module, the generated hash value,
   wherein the card identifier is associated with the encrypted hash value.

5. The method of claim 1, further comprising:
   storing, at the key manager database, the generated hash value; and
   associating, with the processor, the generated hash value with the consumer profile.

6. A system for tracking purchases with a consumer profile, comprising:
   a key manager module, including a hash value generator configured to generate a plurality of hash values from card numbers included in purchase authorization requests from consumers;
   an association module configured to associate the plurality of hash values with a plurality of consumer profiles; and
   a server configured to receive purchase authorization requests from the consumer, the server including:
     a server database that stores the plurality of consumer profiles; and
     a determination module configured to, when the purchase authorization request does not include a consumer identifier:
       determine, with the plurality of consumer profiles stored in the server database and a hash value of a card number included in the purchase authorization request, whether the hash value is associated with one of the plurality of consumer profiles; and
       update a purchase history of the one of the plurality of consumer profiles when it is determined that the hash value is associated with the one of the plurality of consumer profiles
     wherein each of the plurality of card identifiers is generated in a sequential integer increment with respect to a previously generated card identifier of the plurality of card identifiers.

7. The system of claim 6, further comprising:
   a card identifier generator configured to generate a plurality of card identifiers;
   wherein the association module is further configured to associate the plurality of card identifiers with the plurality of hash values and the plurality of consumer profiles; and
   wherein the determination module is further configured to determine whether the hash value is associated with one of the plurality of consumer profiles by determining whether the hash value of the card number included in the purchase authorization request is associated with one of the plurality of card identifiers.

8. The system of claim 6, wherein the key manager module further comprises an encryption module configured to encrypt the generated hash values.

9. The system of claim 6, wherein the association module is configured to associate the plurality of hash values with the plurality of consumer profiles via a plurality of card identifiers generated by a card identifier generator, each of the plurality of card identifiers being associated with one of the plurality of hash values.

10. The system of claim 6, wherein the determination module is further configured to, when the purchase authorization request includes a consumer identifier:
   determine, with the plurality of consumer profiles stored in the server database, whether the consumer identifier is associated with one of the plurality of consumer profiles; and
   update a purchase history of the one of the plurality of consumer profiles when it is determined that the consumer identifier is associated with one of the plurality of consumer profiles.

11. The system of claim 10, wherein the determination module is configured to, if the consumer identifier is not associated with one of the plurality of consumer profiles:
   generate a new consumer profile;
   associate the consumer identifier with the new consumer profile; and
   store, in the server database, the new consumer profile as one of the plurality of consumer profiles.

12. The system of claim 6, wherein the server is configured to, if the determination module determines the hash value of the card number included in the authorization request is not associated with one of the plurality of consumer profiles:
   generate a new consumer profile;
   generate, via a card identifier generator, a card identifier;
   associate, via the association module, the card identifier with the hash value of the card number included in the authorization request;
   associate the card identifier with the new consumer profile; and
   store, in the server database, the new consumer profile as one of the plurality of consumer profiles.

* * * * *